United States Patent
Cao et al.

(10) Patent No.: US 9,294,665 B2
(45) Date of Patent: Mar. 22, 2016

(54) FEATURE EXTRACTION APPARATUS, FEATURE EXTRACTION PROGRAM, AND IMAGE PROCESSING APPARATUS

(75) Inventors: Yunyun Cao, Tokyo (JP); Hirofumi Nishimura, Kanagawa (JP); Sugiri Pranata, Singapore (SG); Zhi Heng Niu, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 14/237,729

(22) PCT Filed: Jul. 31, 2012

(86) PCT No.: PCT/JP2012/004852
§ 371 (c)(1),
(2), (4) Date: Feb. 7, 2014

(87) PCT Pub. No.: WO2013/021580
PCT Pub. Date: Feb. 14, 2013

(65) Prior Publication Data
US 2014/0204238 A1  Jul. 24, 2014

(30) Foreign Application Priority Data
Aug. 11, 2011 (JP) ................................. 2011-176139

(51) Int. Cl.
*H04N 5/232* (2006.01)
*H04N 21/4728* (2011.01)
*G06K 9/46* (2006.01)

(52) U.S. Cl.
CPC .............. *H04N 5/232* (2013.01); *G06K 9/4642* (2013.01); *H04N 21/4728* (2013.01); *G06K 2009/4666* (2013.01); *H04N 2201/33371* (2013.01)

(58) Field of Classification Search
CPC . H04N 21/4728; H04N 5/232; H04N 1/4074; H04N 2201/33371; H04N 2201/33378; H04N 1/32229; H04N 1/32261; G06K 9/4642
USPC ............ 348/222.1, E13.023, E3.02, 399, 672
See application file for complete search history.

(56) References Cited

U.S. PATENT DOCUMENTS

| 4,575,124 | A | * | 3/1986 | Morrison | ....................... 283/115 |
| 2003/0113036 | A1 | * | 6/2003 | Hwang | ........................ 382/285 |

(Continued)

FOREIGN PATENT DOCUMENTS

| CN | 1689044 A | 10/2005 |
| CN | 101266704 A | 9/2008 |

(Continued)

OTHER PUBLICATIONS

Timo Ojala, et al., "Multiresolution Gray-Scale and Rotation Invariant Texture Classification With Local Binary Patterns" IEEE, Pattern Analysis and Machine Intelligence vol. 24 No. 7, pp. 971-978, Jul. 2002.

(Continued)

*Primary Examiner* — Hung Lam
(74) *Attorney, Agent, or Firm* — Pearne & Gordon LLP

(57) ABSTRACT

Provided is a feature extraction device including a sub region setting unit (433) which sets a plurality of sub regions with respect to a pixel of interest, and a binary pattern generation unit (434) which generates a local binary pattern indicating pixel value comparison results relative to each sub region with respect to each pixel of interest. The sub region setting unit (433) sets (436) a region constituted by a plurality of pixels including a pixel separated from the pixel of interest as a sub region, and the binary pattern generation unit (434) calculates (437) a representative value for each sub region and generates (439) a local binary pattern indicating whether or not the difference (438) between the representative value and the value of the pixel of interest is equal to or larger than a predetermined threshold value.

10 Claims, 16 Drawing Sheets

(56) References Cited

U.S. PATENT DOCUMENTS

| | | | |
|---|---|---|---|
| 2006/0045356 A1 | 3/2006 | Turtinen et al. | |
| 2009/0220155 A1 | 9/2009 | Yamamoto et al. | |
| 2010/0066850 A1* | 3/2010 | Wilson et al. | 348/222.1 |
| 2010/0329556 A1 | 12/2010 | Mitarai et al. | |
| 2012/0051642 A1 | 3/2012 | Berrani et al. | |

FOREIGN PATENT DOCUMENTS

| | | | |
|---|---|---|---|
| JP | 2005-537578 A | 12/2005 |
| JP | 2009-086926 A | 4/2009 |
| JP | 2009-211179 A | 9/2009 |
| JP | 2011-008631 A | 1/2011 |
| WO | 2010/116093 A1 | 10/2010 |

OTHER PUBLICATIONS

Xiaoyu Wang, et al., "An HOG-LBP Human Detector with Partial Occlusion Handling," IEEE International Conference on Computer Vision (ICCV 2009), Kyoto, 2009.

Daisuke Sasaki, et al., "A study on a Personal Authentication Using Mannerism of Lip Motion in Utterance", IEICE Technical Report, Feb. 22, 2010, vol. 109, No. 436, pp. 23 to 28.

Yutaka Usui, et al., "A Study on Face Recognition Using Lab for Embedded Hardware Implementation", IEICE Technical Report, Feb. 25, 2010, vol. 109, No. 447, pp. 49 to 52.

Shiguang Shan, et al., "Locally Assembled Binary (LAB) feature with feature-centric cascade for fast and accurate face detection", IEEE Conference on Computer Vision and Pattern Recognition, 2088. CVPR 2008., Jul. 23, 2008, p. 1-7.

International Search Report Application No. PCT/JP2012/004852 dated Oct. 9, 2012.

Topi Maenpaa: "The local binary pattern approach to texture analysis—extensions and applications", Academic Dissertation to Be Presented With the Assent of the Faculty of Medicine, University of Oulu, XX, XX, Aug. 8, 2003, pp. 1-76, XP002554407.

Shengcai Liao et al: "Learning Multi-scale Block Local Binary Patterns for Face Recognition", Aug. 27, 2007, Advances in Biometrics; [Lecture Notes in Computer Science], Springer Berlin Heidelberg, Berlin, Heidelberg, pp. 828-837, XP019098965.

Gerald C Holst: "Imaging system fundamentals", Optical Engineering, vol. 50, No. 5, May 10, 2011 pp. 52601-1, XP055181215.

Extended European Search Report for Application No. 12821503.5 dated Apr. 16, 2015.

English translation of Search Report for Chinese Application No. 201280038798.8 dated Sep. 16, 2015.

* cited by examiner

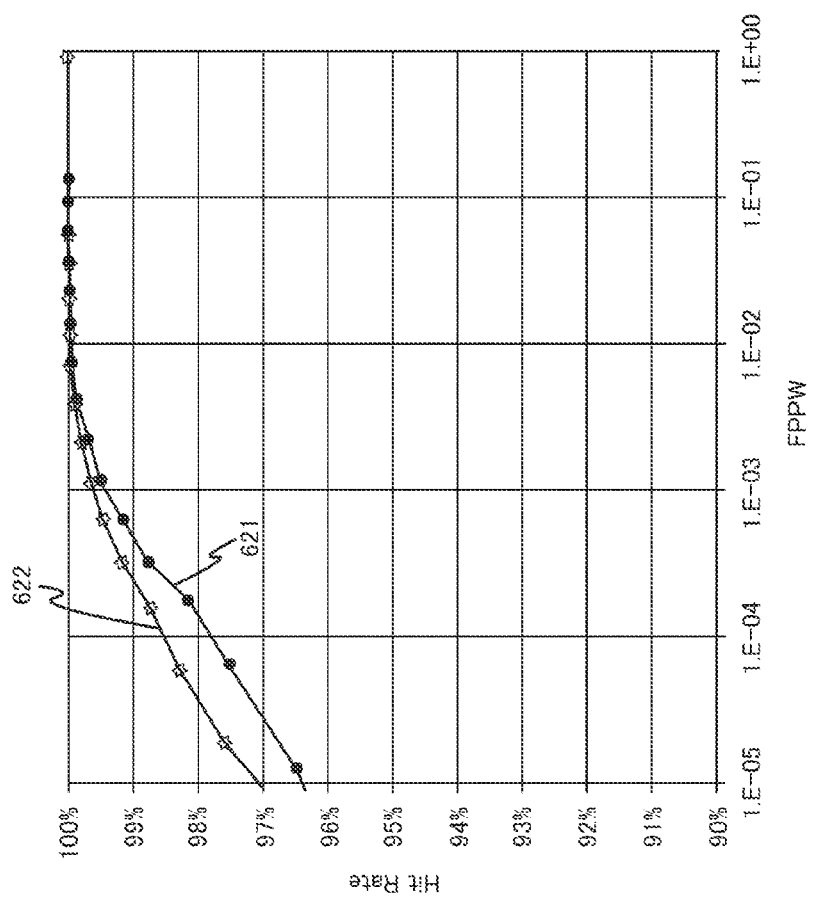

FEATURE EXTRACTION APPARATUS, FEATURE EXTRACTION PROGRAM, AND IMAGE PROCESSING APPARATUS

TECHNICAL FIELD

The present invention relates to a feature extraction apparatus and a feature extraction program that extract an image feature from image data and also to an image processing apparatus including such a feature extraction apparatus.

BACKGROUND ART

Hitherto, techniques have been widely used in which an image feature is extracted from image data to perform the detection or identification of an object included in an image (hereinafter, referred to as "object detection"). A technique that uses Local Binary Patterns (hereinafter, referred to as "LBPs") is disclosed in, for example, NPL 1 as one of such object detection techniques.

LBPs are each a binary pattern created by calculating differences in pixel values between each pixel of interest and pixels located in the surrounding neighborhood of the pixel of interest and arranging the resulting binary numbers. Gray scale patterns in an image can be extracted using LBPs.

The technique disclosed in NPL 1 and NPL 2 (hereinafter, referred to as a "first related art") calculates a local binary pattern with respect to all or some pixels included in a certain region of an image targeted for identification (hereinafter, referred to as a "target image"). The first related art then generates a histogram of values of the LBPs as an image feature. The first related art then generates a classifier in advance using histograms generated from images including a predetermined object and images not including the object (hereinafter, collectively referred to as "training images") and stores the classifier. The first related art then evaluates the histogram of the target image using the classifier to determine whether the target image includes the predetermined object.

Histograms of local binary patterns can represent differences in texture and gray scale patterns more accurately than image features such as histograms of oriented gradients (HOGs). Furthermore, the calculation of histograms of LBPs requires less processing cost compared with image features such as HOGs. Thus, the object detection using LBPs, such as the first related art, is expected to be applied to various fields.

A region targeted for an arithmetic operation of a local binary pattern is generally a 3 pixels×3 pixels region centering around the pixel of interest. However, there is a case where it is desired to use co-occurrence of features in a wider range by setting a wider region targeted for an arithmetic operation depending on the type of image or the type of object targeted for detection, and generating a local binary pattern from more pixels.

In this respect, for example, PTL 1 discloses a technique (hereinafter, referred to as a "second related art") which sets a wider region of 5 pixels×5 pixels or only an outer circumferential portion of the region as a target for an arithmetic operation. Such a related art makes it possible to set a wider region targeted for an arithmetic operation of a local binary pattern.

CITATION LIST

Patent Literature

PTL 1
Japanese Patent Application Laid-Open No. 2009-211179

Non-Patent Literature

NPL 1
Timo Ojala, Matti Pietikäinen and Topi Mäenpää "Multiresolution Gray-Scale and Rotation Invariant Texture Classification With Local Binary Patterns" IEEE, Pattern Analysis and Machine Intelligence vol. 24 no. 7, pp. 971-978, July 2002
NPL 2
Xiaoyu Wang, Tony X. Han and Shuicheng Yan, "An HOG-LBP Human Detector with Partial Occlusion Handling," IEEE International Conference on Computer Vision (ICCV 2009), Kyoto, 2009

SUMMARY OF INVENTION

Technical Problem

In the second related art, however, as a region targeted for an arithmetic operation is made wider, the number of bits of a local binary pattern increases. For example, when the aforementioned region of 3 pixels×3 pixels is targeted for an arithmetic operation, the number of bits is 8. On the other hand, when the aforementioned region of 5 pixels×5 pixels is targeted for an arithmetic operation, the number of bits is 16, which is double, even in a case where only the outer circumferential portion of the region is used. When the number of bits of a local binary pattern increases, the number of dimensions of a histogram increases, so that the processing load in generating a classifier or detecting an object using the classifier increases.

On the other hand, when pixels targeted for an arithmetic operation are decimated, an increase in the number of bits of a local binary pattern can be limited, but the accuracy of object detection decreases accordingly.

That is, the second related art has a problem in that the detection accuracy decreases or the processing load increases when a wider region is targeted for an arithmetic operation of a local binary pattern.

An object of the present invention is to provide a feature extraction apparatus, a feature extraction program, and an image processing apparatus which are capable of generating a local binary pattern from more pixels while limiting a decrease in the accuracy of object detection and an increase in the processing load.

Solution to Problem

A feature extraction apparatus according to an aspect of the present invention includes: a sub-region setting section that sets all or some pixels in an image to be pixels of interest, respectively, and that sets a plurality of sub-regions with respect to each of the pixels of interest; and a binary pattern generating section that generates a local binary pattern for each of the pixels of interest, the local binary pattern indicating comparison results between a pixel value of the pixel of interest and pixels values of the plurality of set sub-regions using bit values, in which: the sub-region setting section sets a region constituted by a plurality of pixels including a pixel separated from the pixel of interest to be at least one of the sub-regions; and the binary pattern generating section calculates representative values respectively for the sub-regions, each of the representative values representing a pixel value of one pixel or a group of pixel values of a plurality of pixels constituting a corresponding one of the sub-regions, and generates, as the local binary pattern, bit data indicating whether differences between a pixel value of the pixel of interest and the representative values are each equal to or greater than a predetermined threshold using bit values.

An image processing apparatus according to an aspect of the present invention includes: the above-mentioned feature extraction apparatus further including a histogram generating section that generates a histogram indicating a distribution of the local binary patterns generated from the image; and an identifying section that determines whether the image includes a predetermined object using a classifier for identifying the predetermined object, based on the histogram generated by the feature extraction apparatus.

A feature extraction program according to an aspect of the present invention is a program causing a computer to execute processing including: setting all or some pixels in an image to be pixels of interest, respectively, and setting a plurality of sub-regions with respect to each of the pixels of interest; and generating a local binary pattern for each of the pixels of interest, the local binary pattern indicating comparison results between a pixel value of the pixel of interest and pixels values of the plurality of set sub-regions using bit values, in which: when the plurality of sub-regions are set, a region constituted by a plurality of pixels including a pixel separated from the pixel of interest is set to be at least one of the sub-regions; and when the local binary pattern is generated, representative values are calculated respectively for the sub-regions, each of the representative values representing a pixel value of one pixel or a group of pixel values of a plurality of pixels constituting a corresponding one of the sub-regions, and when the local binary pattern is generated, bit data indicating whether differences between a pixel value of the pixel of interest and the representative values are each equal to or greater than a predetermined threshold using bit values are generated as the local binary pattern.

Advantageous Effects of Invention

According to the present invention, it is possible to generate a local binary pattern using more pixels while limiting a decrease in the accuracy of object detection and an increase in the processing load.

BRIEF DESCRIPTION OF DRAWINGS

FIG. 18 is a diagram illustrating results of experiments on performance evaluation of the sixth example and the seventh example of the arrangement of the sub-regions in Embodiment 2 of the present invention.

DESCRIPTION OF EMBODIMENTS

Hereinafter, embodiments of the present invention will be described in detail with reference to the accompanying drawings.

(Embodiment 1)

Embodiment 1 of the present invention is an example of a basic aspect of the present invention.

Figure 1:
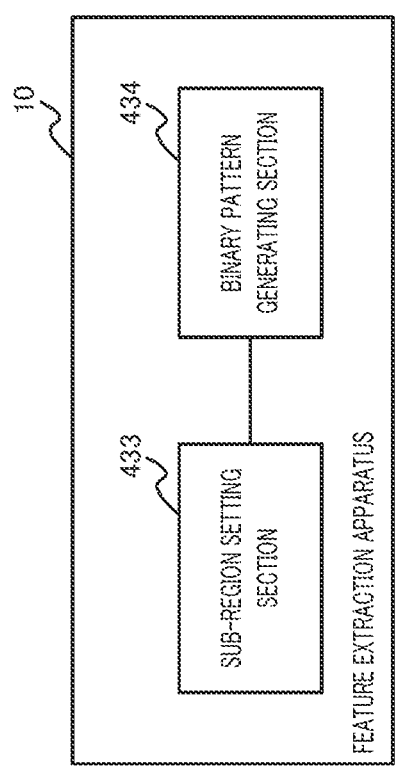
FIG. 1 is a block diagram illustrating an example of a configuration of a feature extraction apparatus according to Embodiment 1 of the present invention.

FIG. 1 is a block diagram illustrating an example of a configuration of a feature extraction apparatus according to the present embodiment.

In FIG. 1, feature extraction apparatus 10 includes sub-region setting section 433 and binary pattern generating section 434.

Sub-region setting section 433 sets all or some pixels in an image to be pixels of interest, respectively, and sets a plurality of sub-regions with respect to each of the pixels of interest. In this case, sub-region setting section 433 sets at least a region constituted by a plurality of pixels which include a pixel separated from the pixel of interest as a sub-region.

Binary pattern generating section 434 generates a local binary pattern, for each pixel of interest, indicating comparison results between a pixel value of the pixel of interest and pixel values of the plurality of set sub-regions using bit values. In this case, binary pattern generating section 434 calculates a representative value, for each sub-region, representing a pixel value of one pixel or a group of pixel values of a plurality of pixels constituting the sub-region. Binary pattern generating section 434 then generates, as the local binary pattern, bit data indicating whether a difference between a pixel value of the pixel of interest and the representative value is equal to or greater than a predetermined threshold, using bit values.

Additionally, feature extraction apparatus 10 may include a configuration of a computer including a CPU (central processing unit) and a recording medium such as a RAM (random access memory), for example. In this case, feature extraction apparatus 10 operates in response to the execution of a stored control program by the CPU.

Feature extraction apparatus 10 described above can generate a local binary pattern from the representative value of pixel values of a plurality of pixels while including pixels separated from the pixel of interest in arithmetic operation targets of the local binary pattern. Thereby, feature extraction apparatus 10 can generate a local binary pattern using more pixels while limiting a decrease in the accuracy of object detection and an increase in the processing load.

(Embodiment 2)

Embodiment 2 of the present invention is an example of a specific aspect when the present invention is applied to an object detection system.

First, a description will be given of a configuration of the object detection system including a feature extraction apparatus according to the present embodiment.

Figure 2:
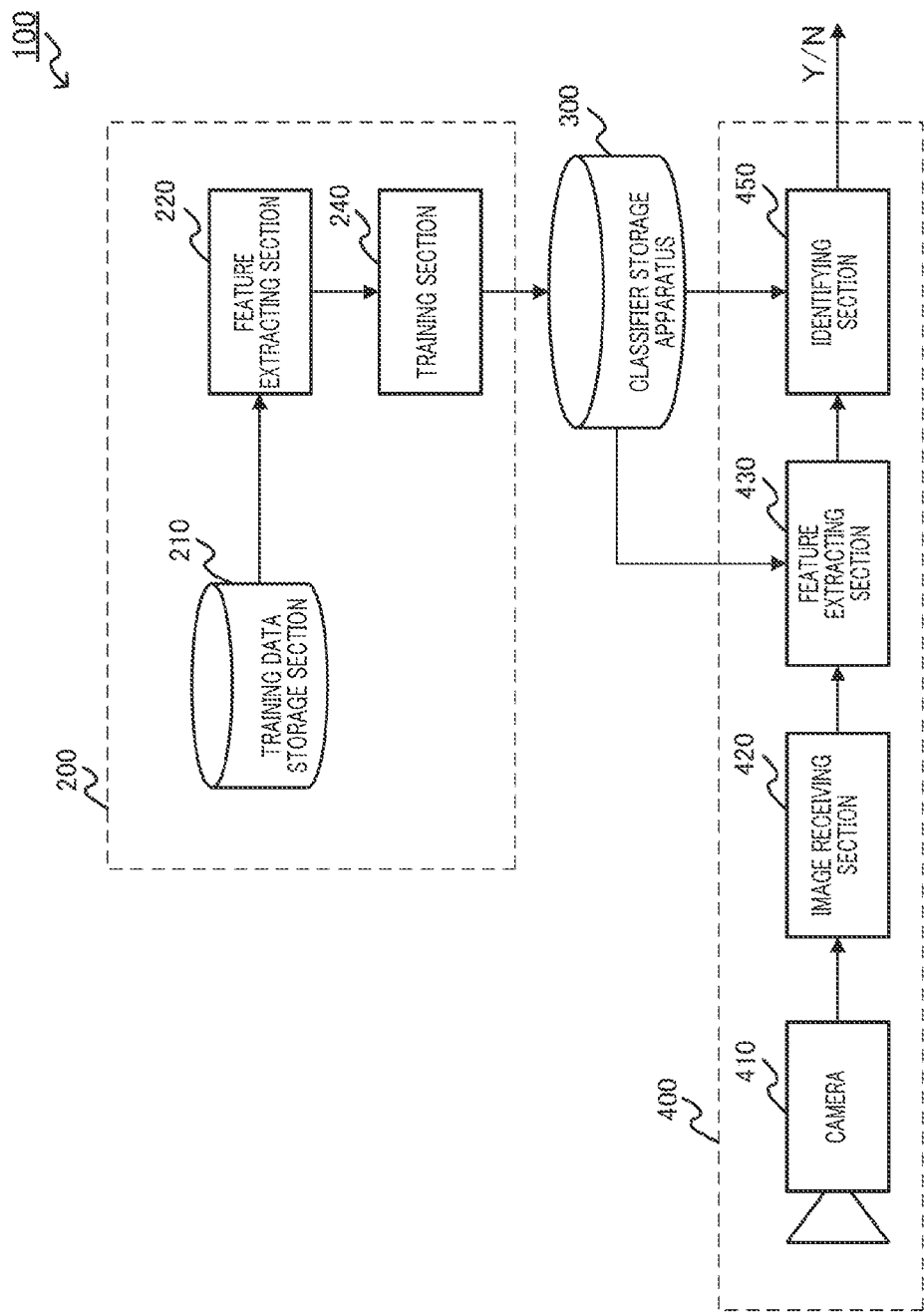
FIG. 2 is a block diagram illustrating an example of a configuration of an object detection system including a feature extraction apparatus according to Embodiment 2 of the present invention.

FIG. 2 is a block diagram illustrating an example of the configuration of the object detection system including the feature extraction apparatus according to the present embodiment.

In FIG. 2, object detection system 100 includes classifier training apparatus 200, classifier storage apparatus 300, and object detection apparatus 400. Classifier training apparatus 200 and object detection apparatus 400 are configured to be capable of being connected to classifier storage apparatus 300 through a communication network such as, for example, the Internet.

In the present embodiment, Boosting is adopted as one example of a machine learning method used by classifier training apparatus 200. Classifier training apparatus 200 trains a classifier for detecting an object targeted for detection (hereinafter, referred to as "detection target object") from images normalized for training in advance, and stores the classifier which is a result of training in classifier storage apparatus 300.

Classifier training apparatus 200 includes training data storage section 210, feature extracting section 220 including the feature extraction apparatus according to the present invention, and training section 240.

Training data storage section 210 stores, in advance a plurality of training images including a detection target object (positive samples), a plurality of training images including no detection target object (negative samples), and candidate region information for feature extraction.

Feature extracting section 220 acquires a feature extraction region for each training image stored in training data storage section 210, and extracts an image feature from the acquired feature extraction region.

The term "feature extraction region" as used herein means an image region targeted for the extraction of an image feature. For example, when a detection target is a human face, the feature extraction region can be set to a large number of image regions randomly arranged which include parts of a human face such as eyes or a nose, for example. In addition, when the detection target is the whole body of a human, the feature extraction region can be set to a large number of image regions randomly arranged which include a head, arms, feet and the like, for example.

Feature extracting section 220 extracts an image feature for each feature extraction region, and outputs the extracted image feature to training section 240. More specifically, feature extracting section 220 first generates a local binary pattern for each one of all or some pixels in the feature extraction region, using the pixel as a pixel of interest. Feature extracting section 220 then generates a histogram indicating the distribution of the generated local binary patterns (hereinafter, simply referred to as a "histogram") as an image feature of the feature extraction region.

The term "local binary pattern" as used herein means information indicating comparison results between a pixel value of the pixel of interest and pixel values of sub-regions, using bit values. A method of setting the sub-regions and a method of comparing pixel values between a pixel of interest and each of the sub-regions will be described later.

Training section 240 generates one or a plurality of classifiers for distinguishing an image including a detection target object and an image not including the detection target object, on the basis of a histogram group obtained from a positive sample and a histogram group obtained from a negative sample. That is, training section 240 generates feature extraction region information and identification information corresponding to the feature extraction region information as classifiers. Training section 240 then transmits the generated identification information together with the feature extraction region information to classifier storage apparatus 300, and stores the identification information in association with the feature extraction region information.

The term "feature extraction region information" as used herein means information indicating the range of a feature extraction region, and includes, for example, the position and size of the feature extraction region. The term "identification information" as used herein means information used to evaluate the histogram of the feature extraction region of a target image and determining whether the target image includes a predetermined object.

Object detection apparatus 400 acquires a classifier stored in classifier storage apparatus 300 for the object detection from a target image.

Object detection apparatus 400 includes camera 410, image receiving section 420, feature extracting section 430 having a feature extraction apparatus according to the present invention, and identifying section 450.

Camera 410 takes a target image and outputs the target image to image receiving section 420.

Image receiving section 420 scans the target image with a window having a predetermined size and outputs individual scanned image regions (hereinafter, referred to as "window regions") to feature extracting section 430.

Feature extracting section 430 acquires an area within each window region, indicated by the feature extraction region information stored in the classifier storage apparatus in the window region, as a feature extraction region.

Feature extracting section 430 then extracts an image feature for each feature extraction region and outputs the extracted image feature to identifying section 450. More specifically, feature extracting section 430 generates a local binary pattern for each pixel of the feature extraction region and generates a histogram of the local binary patterns as an image feature of the feature extraction region.

Meanwhile, a process performed on a window region by feature extracting section 430 and a process performed on a training image by feature extracting section 220 within aforementioned classifier training apparatus 200 are similar to each other. That is, feature extracting section 220 within classifier training apparatus 200 acquires all of many regions prepared as candidate regions in advance, for example, as feature extraction regions. On the other hand, feature extracting section 430 acquires only those regions indicated by the feature extraction region information already selected by training section 240 from classifier storage apparatus 300, as feature extraction regions. Accordingly, hereinafter, the description of one configuration and operation will be given appropriately, and thus the description of the other configuration and operation will be omitted.

Figure 3:
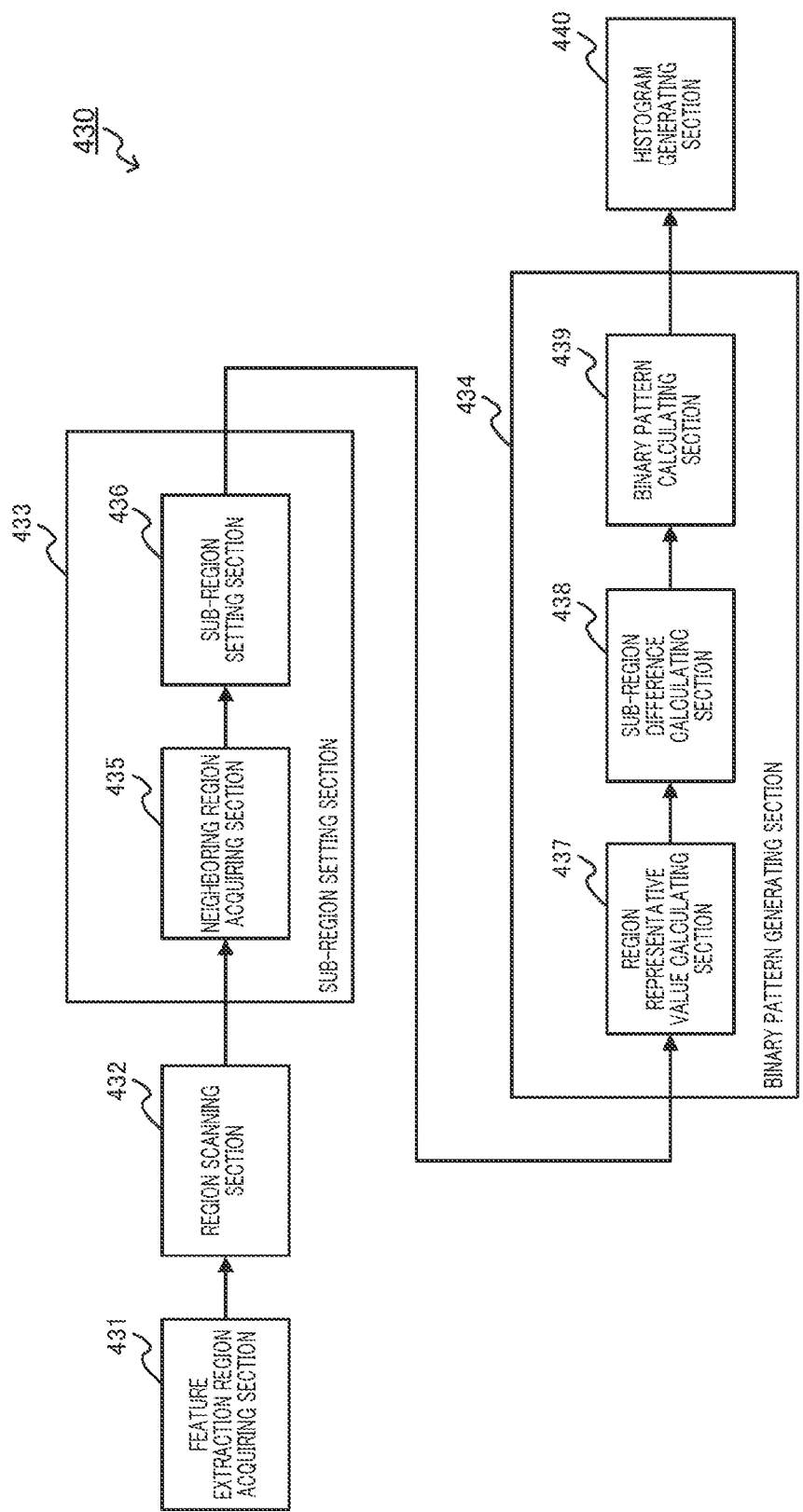
FIG. 3 is a block diagram illustrating a detailed configuration of a feature extracting section according to Embodiment 2 of the present invention.

FIG. 3 is a block diagram illustrating a detailed configuration of feature extracting section 430.

In FIG. 3, feature extracting section 430 includes feature extraction region acquiring section 431, region scanning section 432, sub-region setting section 433, binary pattern generating section 434, and histogram generating section 440.

Feature extraction region acquiring section 431 acquires an area within each window region which is received from image receiving section 420, indicated by the feature extraction region information stored in classifier storage apparatus 300 in the window region, as a feature extraction region. The acquired feature extraction region is then output to region scanning section 432.

Region scanning section 432 scans the feature extraction region which is received from feature extraction region acquiring section 431 at a predetermined interval, and outputs a scanned pixel to sub-region setting section 433 as a pixel of interest.

Sub-region setting section 433 uses each one of all or some pixels of the feature extraction region which is received from region scanning section 432, as a pixel of interest, and sets a plurality of sub-regions with respect to the pixel of interest.

Sub-region setting section 433 includes neighboring region acquiring section 435 and sub-region setting section 436.

Neighboring region acquiring section 435 sets a neighboring region centering around the pixel of interest with respect to the pixel of interest which is received from region scanning section 432 and acquires a pixel value of each pixel. In this case, neighboring region acquiring section 435 sets a region constituted by a plurality of pixels including pixels separated from the pixel of interest to be a neighboring region. Neighboring region acquiring section 435 then outputs the set neighboring region and a plurality of acquired pixels values to sub-region setting section 436 for each pixel of interest.

Sub-region setting section 436 sets a plurality of sub-regions from the neighboring region which is received from neighboring region acquiring section 435. Sub-region setting section 436 then outputs a pixel value of the pixel of interest (hereinafter, referred to as a "value of the pixel of interest") and pixel value of each pixel of each sub-region to binary pattern generating section 434 for each pixel of interest. In this case, sub-region setting section 436 sets at least one sub-region constituted by a plurality of pixels including pixels separated from the pixel of interest. Moreover, in this case, sub-region setting section 436 sets sub-regions on the basis of the spatial frequency characteristics of camera 410. A method of setting a sub-region on the basis of the spatial frequency characteristics of camera 410 will be described later.

Binary pattern generating section 434 generates a local binary pattern, for each pixel of interest, indicating comparison results between a pixel value of the pixel of interest and pixel values of a plurality of sub-regions using bit values.

Binary pattern generating section 434 includes region representative value calculating section 437, sub-region difference calculating section 438, and binary pattern calculating section 439.

Region representative value calculating section 437 calculates a representative value for each sub-region, the representative value representing a pixel value of one pixel or a group of pixel values of a plurality of pixels constituting the sub-region (hereinafter, referred to as a "region representative value"). Region representative value calculating section 437 then outputs the value of the pixel of interest and the calculated region representative value to sub-region difference calculating section 438, for each sub-region.

In the present embodiment, region representative value calculating section 437 sets a pixel value of one pixel to be a region representative value with respect to a sub-region constituted by one pixel, and sets an average of pixel values of a plurality of pixels to be a region representative value with respect to a sub-region constituted by the plurality of pixels.

Sub-region difference calculating section 438 calculates a difference between the value of the pixel of interest and each of the region representative values which are received from region representative value calculating section 437, for each pixel of interest. Sub-region difference calculating section 438 then outputs differences between the pixel of interest and calculated adjacent sub-regions to binary pattern calculating section 439, for each pixel of interest.

Binary pattern calculating section 439 determines for each pixel of interest whether the difference corresponding to each of the sub-regions which are received from sub-region difference calculating section 438 is equal to or greater than a predetermined threshold. A local binary pattern indicating whether the difference corresponding to each of the sub-regions is equal to or greater than a predetermined threshold is then generated for each pixel of interest, and is output to histogram generating section 440.

Histogram generating section 440 generates a histogram, for each feature extraction region, indicating the distribution of local binary patterns of the feature extraction region on the basis of the local binary patterns which are received from binary pattern calculating section 439. Histogram generating section 440 then outputs the generated histogram to identifying section 450 of FIG. 2, for each feature extraction region.

Identifying section 450 of FIG. 2 acquires identification information stored in classifier storage apparatus 300. Identifying section 450 calculates a score indicating whether a part of a detection target object is included in a target image from the histogram which is received from feature extracting section 430, using the acquired identification information. Identifying section 450 then accumulates the scores of all the feature extraction regions stored in classifier storage apparatus 300, and determines whether a detection target object is included in a target image from the accumulated scores. Identifying section 450 notifies a user of determination results through, for example, an image display apparatus or a voice output apparatus (not shown).

Meanwhile, classifier training apparatus 200 and object detection apparatus 400 can each have a configuration of a computer including a recording medium or the like such as, for example, a CPU and a RAM. In this case, classifier training apparatus 200 and object detection apparatus 400 each operate in response to the execution of a stored control program by the CPU. In addition, object detection apparatus 400 may be a dedicated chip for performing only calculation. In addition, classifier storage apparatus 300 may be a network server including a recording medium such as, for example, a semiconductor memory or a hard disk.

In order to accurately extract a feature of a training image or a feature of a target image, a wider region, that is, it is preferable to use more pixels as an arithmetic operation target of the local binary pattern. However, as mentioned above, an increase in the number of pixels of a neighboring region alone leads to concerns of an increase in the processing load and may cause a decrease in the detection accuracy because of the presence of noise.

For this reason, object detection system 100 sets a sub-region constituted by a plurality of pixels and calculates a region representative value by performing statistical processing on the pixel values of the sub-region. Object detection system 100 then uses the region representative value in feature extraction. Thereby, object detection system 100 can not only reduce the number of bits of the local binary pattern, but also reduce noise in units of pixels in the binary pattern. When object detection is performed using such a histogram of the binary pattern, it is possible to reduce arithmetic operation costs and to perform object detection robust to noise.

Therefore, object detection system 100 can generate a local binary pattern from more pixels while limiting a decrease in the accuracy of object detection and an increase in the processing load. That is, when object detection is performed on an image, object detection system 100 can use an image feature capable of rapid and robust object detection with respect to a noisy image taken in an environment where illuminance is low, for example.

The configuration of object detection system 100 has been described thus far.

Next, the operation of object detection apparatus 400 including a feature extraction apparatus according to the present invention will be described. Note that, the operation of feature extracting section 220 in classifier training apparatus 200 is the same as that of feature extracting section 430 in object detection apparatus 400; hence, a redundant description will be omitted.

Figure 4:
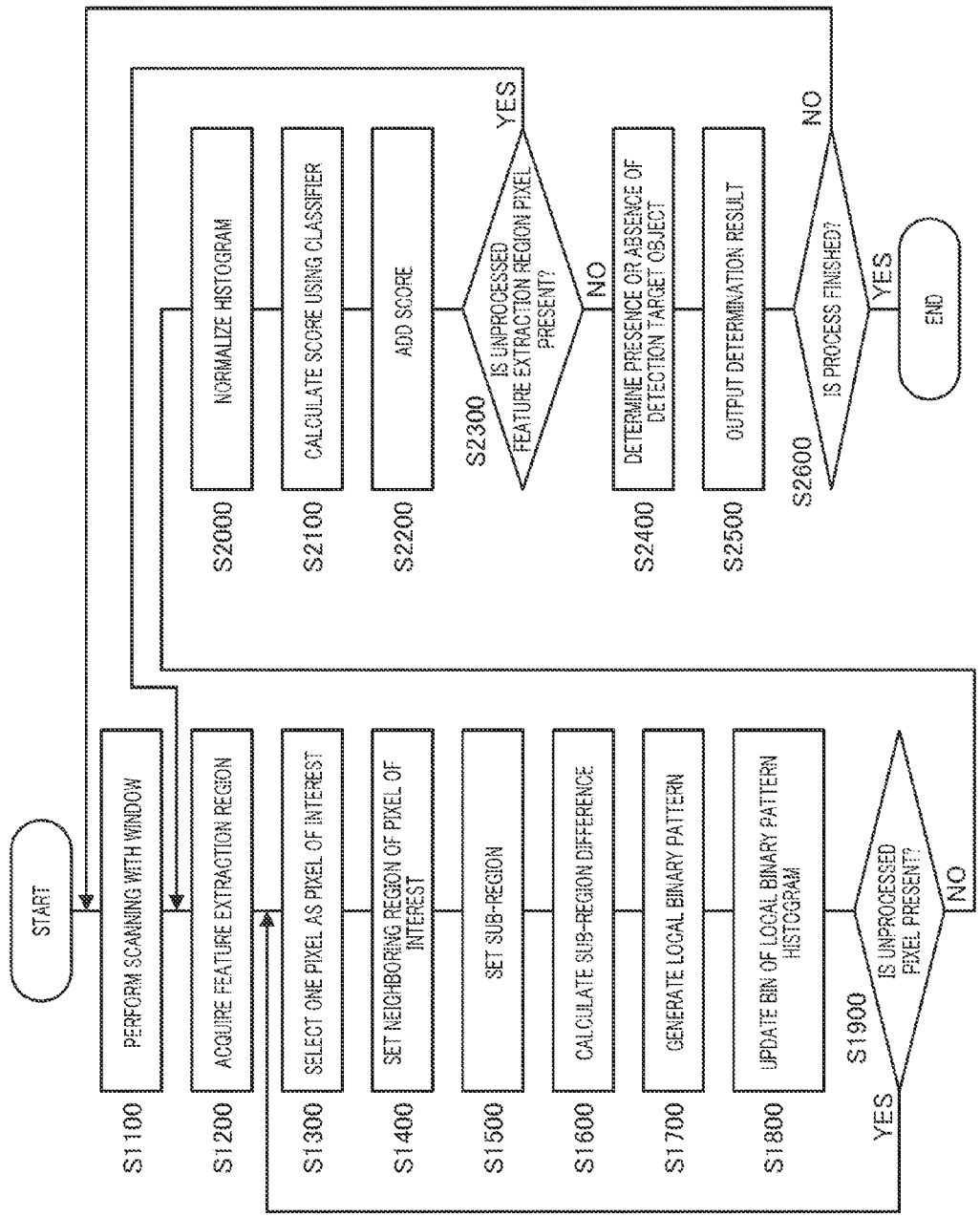
FIG. 4 is a flowchart illustrating the operation of an object detection apparatus according to Embodiment 2 of the present invention.

FIG. 4 is a flowchart illustrating the operation of object detection apparatus 400.

First, in step S1100, image receiving section 420 scans a target image with a window having a predetermined size.

Figure 5:
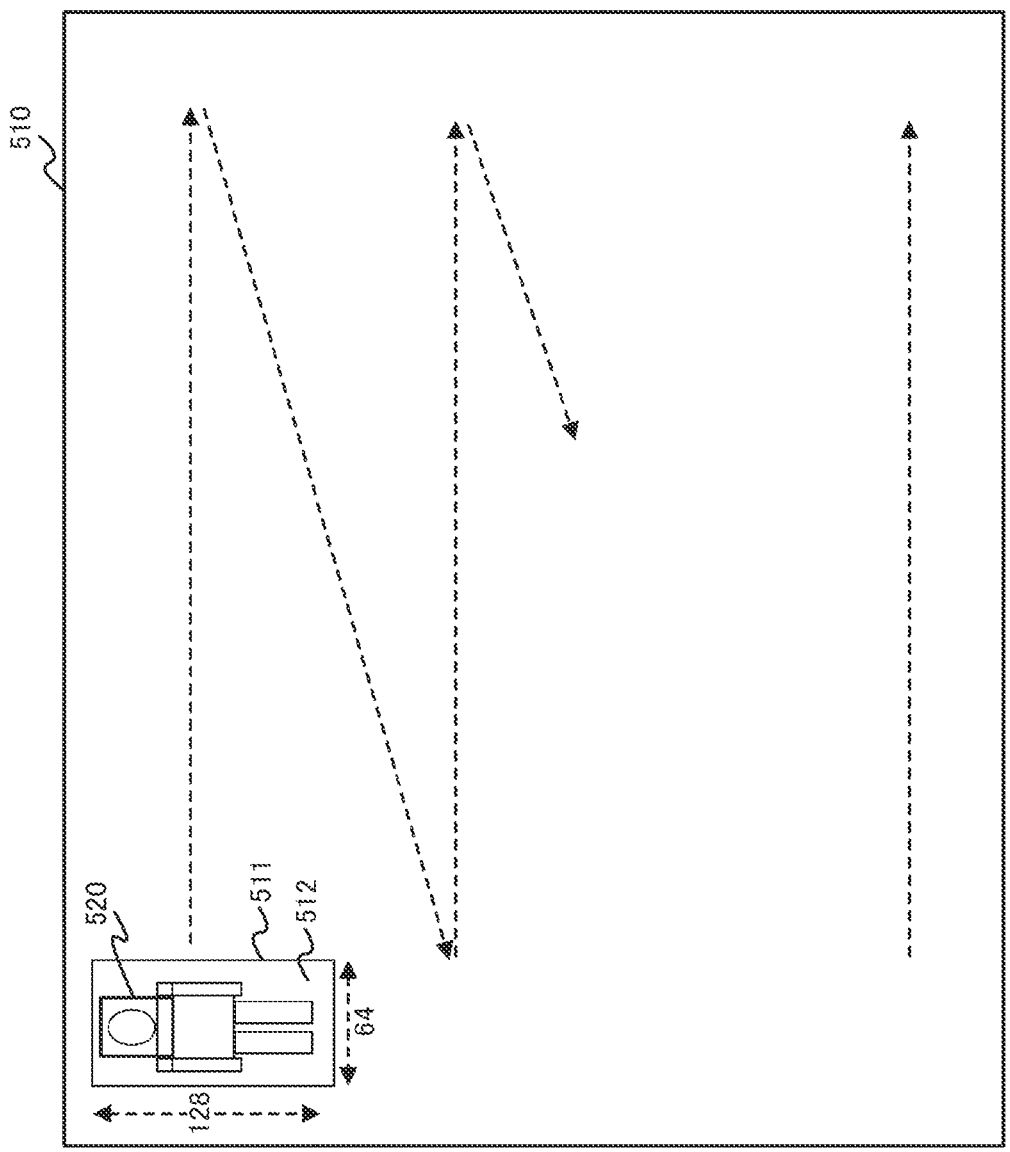
FIG. 5 is a schematic diagram illustrating an example of how an image is scanned in Embodiment 2 of the present invention.

FIG. 5 is a schematic diagram illustrating an example of how an image is scanned.

As shown in FIG. 5, image receiving section 420 scans the entirety of target image 510 with window 511 having a predetermined size and acquires window region 512 at various positions. The size of window 511 is 64 pixels×128 pixels, for example.

In step S1200 of FIG. 4, feature extraction region acquiring section 431 of feature extracting section 430 shown in FIG. 3 acquires one information item (position, size and the like) of a feature extraction region obtained by training of classifier training apparatus 200 and is stored in the classifier storage apparatus. Feature extraction region acquiring section 431 acquires a rectangular region including a human head as feature extraction region 520, for example, as shown in FIG. 5.

In step S1300, region scanning section 432 of feature extracting section 430 selects one pixel of feature extraction region 520 as a pixel of interest.

In step S1400, neighboring region acquiring section 435 sets a neighboring region centering around the pixel of interest which is scanned in step S1300. Region scanning section 432 selects an unselected pixel whenever the flow returns to step S1300 through a determination process of step S1900 described later, and consequently shifts the neighboring region.

Figure 6:
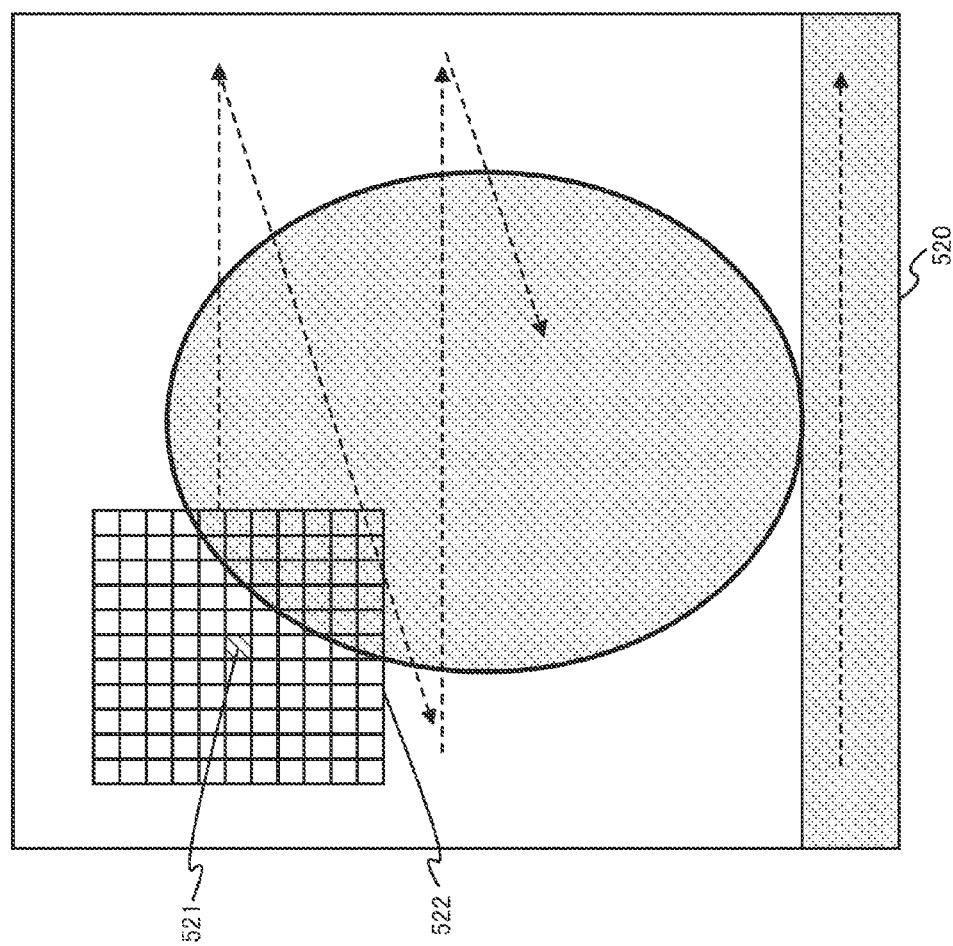
FIG. 6 is a schematic diagram illustrating an example of how a neighboring region is shifted in Embodiment 2 of the present invention.

FIG. 6 is a schematic diagram illustrating an example of how a neighboring region is shifted.

As shown in FIG. 6, region scanning section 432 shifts pixel of interest 521 in the entirety of feature extraction region 520, to thereby shift neighboring region 522 centering around pixel of interest 521.

In the present embodiment, as shown in FIG. 6, neighboring region acquiring section 435 sets a region of 11 pixels×11 pixels centering around pixel of interest 521 as neighboring region 522, for each pixel of interest 521. That is, neighboring region acquiring section 435 sets 121 pixels as a neighboring region.

In step S1500 of FIG. 4, sub-region setting section 436 of feature extracting section 430 sets a sub-region from the neighboring region of the pixel of interest. In this case, sub-region setting section 436 sets a sub-region on the basis of the spatial frequency characteristics of camera 410.

Figure 7:
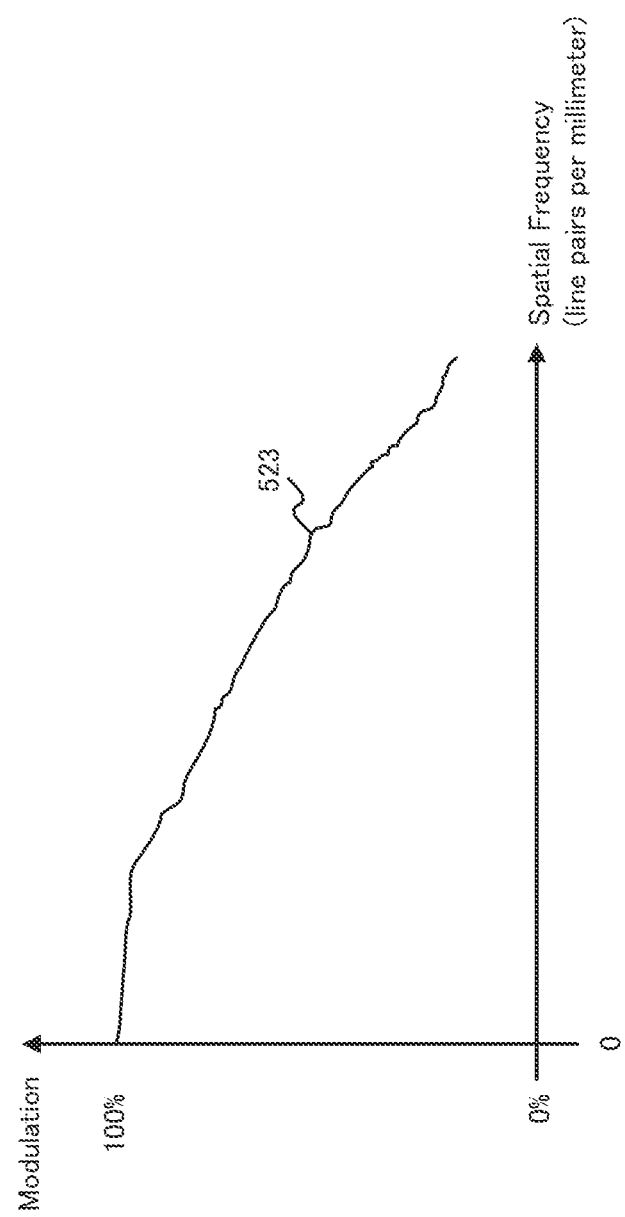
FIG. 7 is a graph illustrating an example of spatial frequency characteristics of a camera in Embodiment 2 of the present invention.

FIG. 7 is a graph illustrating an example of the spatial frequency characteristics of camera 410. In FIG. 7, the horizontal axis represents a spatial frequency, and the vertical axis represents a signal (contrast reproduction ratio) which is output from camera 410.

As shown in FIG. 7, output 523 of camera 410 is filtered in a high spatial frequency. That is, a lens of camera 410 has characteristics of MTF (Modulation Transfer Function) similar to those of a low-pass filter. According to such characteristics, the pixel values between pixels adjacent to each other of an image captured by camera 410 smoothly change, and have no large change in luminance values in a length shorter than the number of pixels equivalent to the maximum value of the spatial frequency reproducible by camera 410.

Consequently, sub-region setting section 436 sets the sub-region so that the size of the sub-region is set to be such a size that all the pixel values in the length direction of the sub-region can be regarded as being almost equal to each other (hereinafter, referred to as an "equal pixel value length"). Here, the size of the sub-region corresponds to at least one of the width of the sub-region, the length thereof, the distance thereof from the pixel of interest, and the distance thereof from another sub-region. Thereby, sub-region setting section 436 can set such a sub-region that the feature of this region is reflected by a region representative value with high accuracy. For example, when the interval between two pixels (the number of pixels) is equal to or less than the number of pixels equivalent to the reciprocal of the maximum value of a spatial frequency, the two pixels can be treated as having the same luminance. That is, when the interval between a plurality of pixels is equal to or less than the number of pixels equivalent to the reciprocal of the maximum value of a spatial frequency, a sub-region is formed by the plurality of pixels.

The MTF characteristics are different from each other depending on the type of camera. In addition, in an ordinary camera, a spatial frequency for an image pickup device is set to be high in order to increase a sense of resolution. In this case, a spatial frequency is not set to be a value equal to or greater than the reciprocal of the interval between pixels of an image pickup device so that a pseudo-striped pattern due to folding noise is not generated even when an image of a fine stripe is taken. That is, the pixel values of pixels, separated by two to three adjacent pixels, in an image taken by camera 410 are nearly equal to each other regardless of the type of camera. For this reason, it is preferable to set the size of the sub-region to be a size of two or three pixels. The reason is because small differences in pixel values between two to three pixels adjacent to each other result in a small loss of amount of information when these pixels are treated as one information item, and it is possible to limit increases in the amount of arithmetic operation of feature extraction and the number of feature dimensions. Meanwhile, when the MTF characteristics of camera 410 are low-pass filter characteristics of a narrow bandwidth having a low frequency (that is, attenuated drastically), the size of the sub-region may be set to a size of four or more pixels.

Figure 8:
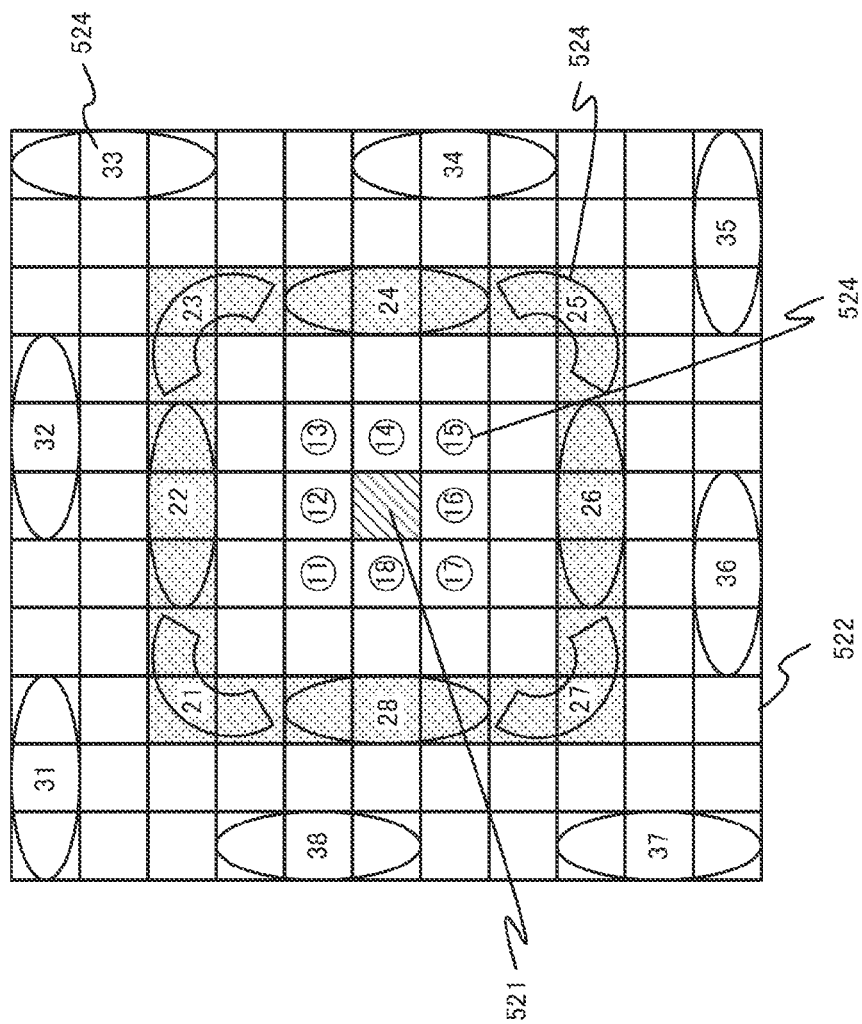
FIG. 8 is a schematic diagram illustrating a first example of the arrangement of sub-regions in the Embodiment 2 of the present invention.

FIG. 8 is a schematic diagram illustrating an example of the arrangement of sub-regions.

As shown in FIG. 8, in the present embodiment, sub-region setting section 436 sets each of eight pixels (denoted by numbers 11 to 18) adjacent to pixel of interest 521 in neighboring region 522 to be sub-region 524. In addition, sub-region setting section 436 sets eight regions (denoted by numbers 21 to 28) each to be sub-region 524. The eight regions are obtained by separating a group of twenty-four pixels separated from the pixel of interest 521 by two pixels into groups each including three pixels. Further, sub-region setting section 436 sets eight regions (denoted by numbers 31 to 38) each to be to sub-region 524. The eight regions are each constituted by three pixels and separated by equiangular intervals from pixel of interest 521 among forty pixel groups separated from the pixel of interest 521 by four pixels. That is, sub-region setting section 436 sets three sets of eight regions (8×3) having different pixel distances from the pixel of interest to be sub-regions 524.

In step S1600 of FIG. 4, region representative value calculating section 437 obtains an average of pixel values of the sub-regions as a region representative value for each sub-region group. Sub-region difference calculating section 438 calculates a difference between each region representative value and the pixel of interest.

In the present embodiment, the regions of three sets of eight sub-regions (8×3) having different distances from the pixel of interest are set as sub-regions. For this reason, region representative value calculating section 437 generates three sets of eight difference values for each pixel of interest.

In step S1700, binary pattern calculating section 435 binarizes the difference values by comparison results with a predetermined threshold, and generates a local binary pattern.

In the present embodiment, binary pattern calculating section 435 sets "0" to the predetermined threshold. Binary pattern calculating section 435 then sets a value of "1" with respect to a sub-region having a difference equal to or greater than a predetermined threshold and sets a value of "0" with respect to a sub-region having a difference less than a predetermined threshold.

That is, local binary pattern $LBP_{P,R}$ is expressed by, for example, the following Equation 1. Here, $g_c$ is the pixel value of a pixel of interest, and P is the number of sub-regions (eight in the present embodiment). In addition, p is the order of sub-regions, $g_p$ is the pixel average value (that is, representative value) of p-th sub-region, and R is the number of pixels (1, 3, and 5 in the present embodiment) equivalent to the distance between the sub-region and the pixel of interest.

(Equation 1)

$$LBP_{P,R} = \sum_{p=0}^{P-1} s(g_p - g_c)2^p, s(x) = \begin{cases} 1, & x \geq 0 \\ 0, & x < 0 \end{cases} \quad [1]$$

In the present embodiment, since the regions of three sets of eight regions (8×3) having different distances from the pixel of interest are set as sub-regions, binary pattern calculating section 435 generates three 8-bit binary patterns for each pixel of interest.

In step S1800, histogram generating section 440 adds 1 to a bin of local binary pattern $LBP_{P,R}$ among bins constituting a histogram.

In step S1900, region scanning section 432 determines whether an unprocessed pixel is present in a feature extraction region. When region scanning section 432 determines that an unprocessed pixel is present (S1900: YES), the flow returns to step S1300, then selects the unprocessed pixel and repeats the same process. In addition, when region scanning section 432 completes the process of all the feature extraction regions (S1900: NO), the flow proceeds to step S2000.

In the present embodiment, histogram generating section 440 finally generates three histograms for each feature extraction region.

Figure 9:
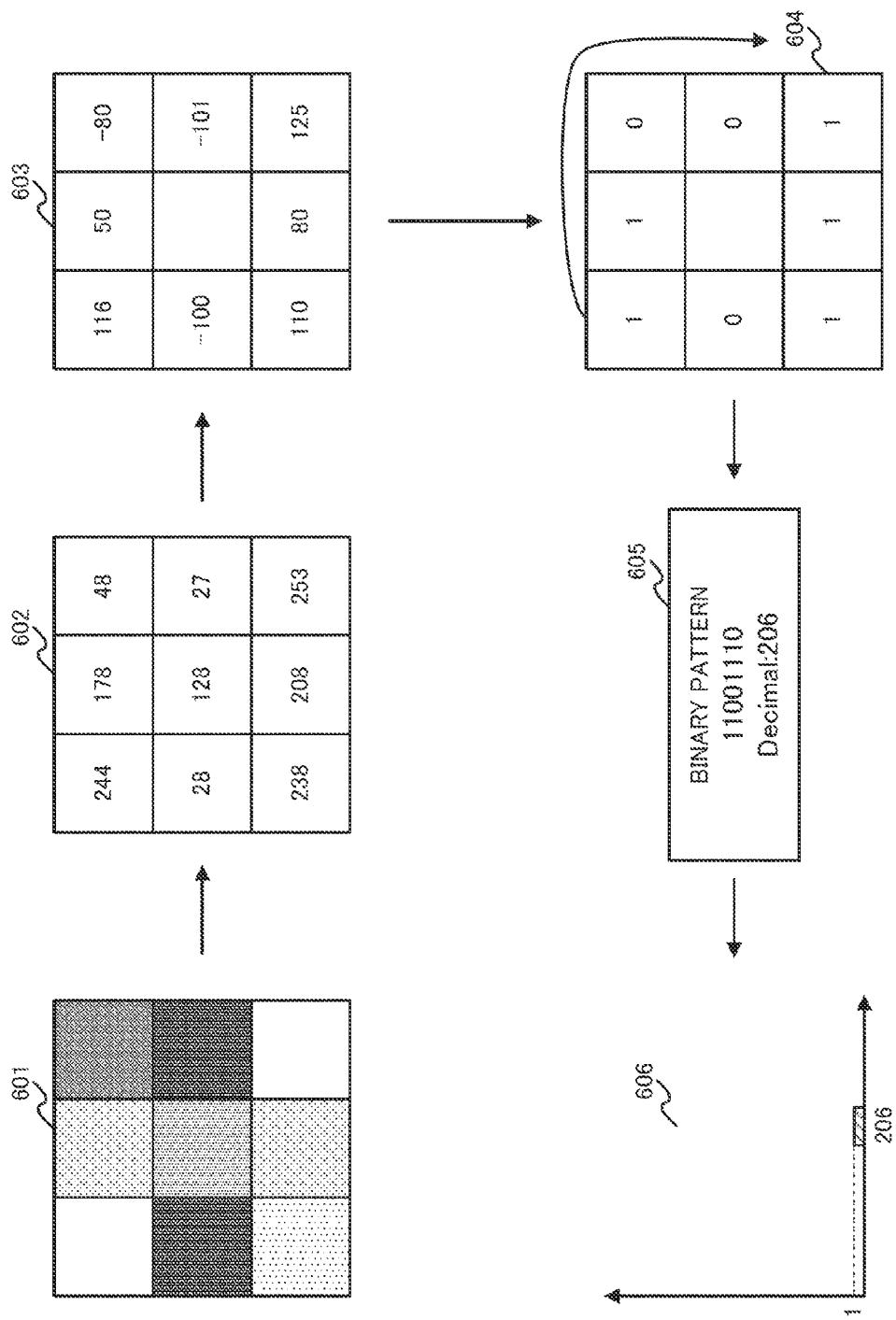
FIG. 9 is a schematic diagram illustrating an outline of an example of processes until a local binary pattern in Embodiment 2 of the present invention is reflected in a histogram.

FIG. 9 is a schematic diagram illustrating an outline of an example of processes until a certain local binary pattern is reflected in a histogram.

As shown in FIG. 9, pixel value $g_c$ of a pixel of interest is assumed to be "128" with respect to partial region 601 of R=1 of neighboring region 522. Numerical value group 602 in which pixel values $g_p$ of the sub-regions (one pixel when R=1) are [244, 178, 48, 27, 253, 208, 238, 28] is assumed to be acquired. Meanwhile, pixel value $g_p$ is assumed to be acquired clockwise from the upper left of the neighboring pixel. In this case, numerical value group 603 of a neighboring difference $(g_p-g_c)$ is [116, 50, −80, −101, 125, 80, 110, −100]. Here, when a binarized threshold is set to "0", numerical value group 604 obtained by binarizing the neighboring differences is [1, 1, 0, 0, 1, 1, 1, 0]. Local binary pattern 605 is set to "11001110" ("206" in decimal).

Histogram generating section 440 adds 1 to the bin "206" to generate histogram 606.

Such repetitive addition to the bin finally generates a histogram indicating a feature of a feature extraction region image. When the maximum value of the number of local binary patterns obtained from a feature extraction region having, for example, a size of I×J is set to K, histogram H (k) is expressed by the following Equation 2.

(Equation 2)

$$H(k) = \sum_{i=1}^{I} \sum_{j=1}^{J} f(LBP_{P,R}(i,j), k), \quad [2]$$

$k \in [0, K],$ where $$f(x, y) = \begin{cases} 1, & \text{if } x = y \\ 0, & \text{otherwise} \end{cases}$$

Meanwhile, binary pattern calculating section 435 may arrange three local binary patterns in a predetermined order to thereby generate one 24-bit binary pattern for each pixel of interest. In this case, histogram generating section 440 finally generates one histogram for each feature extraction region.

In step S2000 of FIG. 4, histogram generating section 440 normalizes the histogram to a feature amount independent of the size of a feature extraction region. Specifically, histogram generating section 440 normalizes the histogram, for example, using the sum of values of all the bins in the histogram. When the number of bins is set to N and the frequency of the i-th bin is set to $H_i$ (i=1, 2, ..., and N), the sum of the values $SumH_i$ is expressed by the following Equation 3.

(Equation 3)

$$SumH_i = \sum_{i=1}^{N} H_i \quad [3]$$

Value $H_i'$ of the i-th bin in the normalized histogram is expressed by the following Equation 4.

(Equation 4)

$$H_i' = \frac{H_i}{SumH_i} \quad [4]$$

Figure 10A:
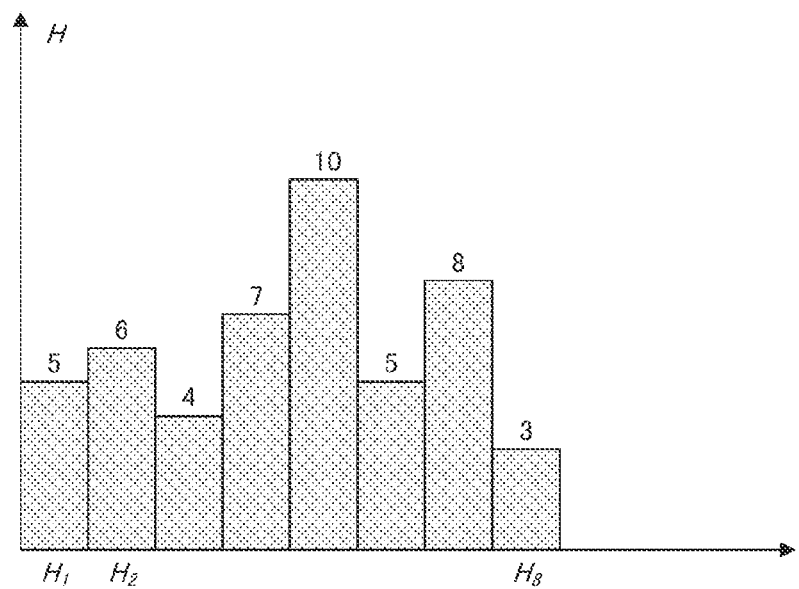
FIGS. 10A and 10B are diagrams illustrating an example of how a histogram is normalized in Embodiment 2 of the present invention.
Figure 10B:
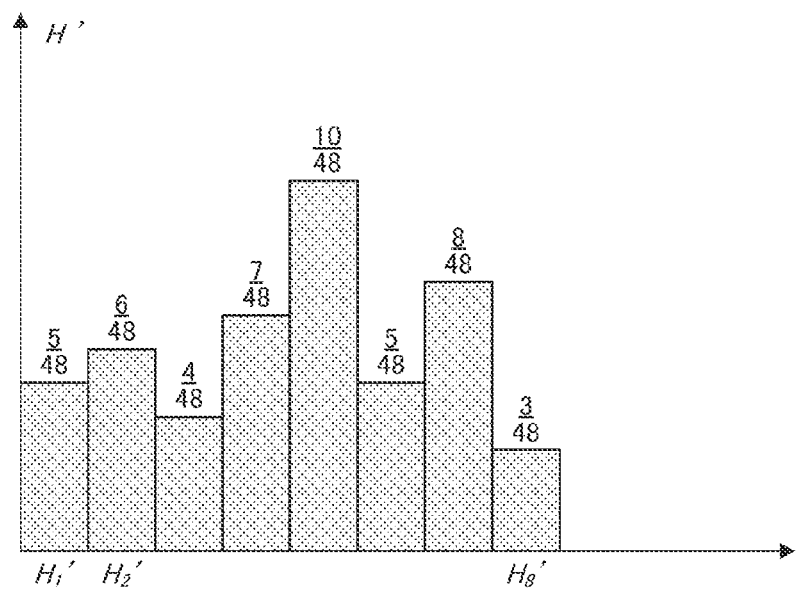

FIGS. 10A and 10B are diagrams illustrating an example of how a histogram is normalized.

As shown in FIG. 10A, values $H_1, H_2, \ldots,$ and $H_8$ of the respective bins in a histogram before normalization are assumed to be "5, 6, 4, 7, 10, 5, 8, and 3" in this order. In this case, the sum of the bin values $SumH_i$ is calculated as in the following Equation 5.

$$SumH_i = \sum_{i=1}^{N} H_i = 5+6+4+7+10+5+8+3 = 48 \quad \text{(Equation 5)}$$

Values $H_1', H_2', \ldots,$ and $H_8'$ of the respective bins in the normalized histogram are calculated as in the following Equation 6.

(Equation 6)

$$H_1' = \frac{H_1}{SumH_1} = \frac{5}{48}$$
$$H_2' = \frac{H_2}{SumH_2} = \frac{6}{48}$$
$$\vdots$$
$$H_8' = \frac{H_8}{SumH_8} = \frac{3}{48} \quad [6]$$

In step S2100 of FIG. 4, identifying section 450 acquires a classifier from classifier storage apparatus 300, and calculates a score indicating likelihood used to determine whether a current feature extraction region includes the detection target object on the basis of the histogram after normalization.

In step S2200, object detection apparatus 400 accumulates the calculated scores.

In step S2300, feature extracting section 430 determines whether an unprocessed feature extraction region is present. Specifically, feature extracting section 430 determines whether this section has calculated scores of all of the feature extraction regions associated with the feature extraction region information stored in classifier storage apparatus 300. IF feature extracting section 430 determines that an unprocessed feature extraction region is present (S2300: YES), the process returns to step S1200 to process the unprocessed feature extraction region. If feature extracting section 430 has processed all the feature extraction regions (S2300: NO), the process proceeds to step S2400.

In step S2400, identifying section 450 determines whether each scanned window includes the detection target object on the basis of the accumulated score. That is, if the score is equal to or greater than a predetermined threshold, identifying section 450 determines that the particular window includes the detection target object. Note that, identifying section 450 may also perform the determination on the basis of a predetermined function to the score.

In step S2500, identifying section 450 outputs the results of determination of the object detection.

Identifying section 450 may also determine whether a designated object is included in a target image, and determine what object is included in the target image. In the former case, identifying section 450 may use, for example, only a classifier corresponding to a designated object and output information indicating whether the object is included. In the latter case, identifying section 450 may use classifiers one after another to repeat the determination, and if an object is detected, output information indicating what object is detected.

In step S2600, image receiving section 420 determines whether the instruction to finish the process has been input by operation. If image receiving section 420 has not received such an instruction (S2600: NO), the process returns to step S1100 to perform the next scan or process the next target image. If image receiving section 420 has received such an instruction (S2600: YES), the apparatus finishes the process.

According to such an operation, object detection apparatus 400 can set a plurality of sub-regions constituted by a plurality of pixels to generate a histogram of local binary patterns using the difference between the values of the pixel of interest and the average values of the sub-regions. Thereby, object detection apparatus 400 can generate a histogram of local binary patterns robust to noise in which computation cost is low and the number of dimensions is small. Object detection apparatus 400 can perform object detection using the histogram as an image feature.

The operation of object detection apparatus 400 has been described thus far.

Meanwhile, the arrangement of sub-regions is not limited to the example shown in FIG. 8. Classifier training apparatus 200 and object detection apparatus 400 can set the sub-region arrangement with various types of patterns in accordance with the spatial frequency characteristics of camera 410, and the like.

Hereinafter, various types of sub-region arrangements will be described.

Figure 11:
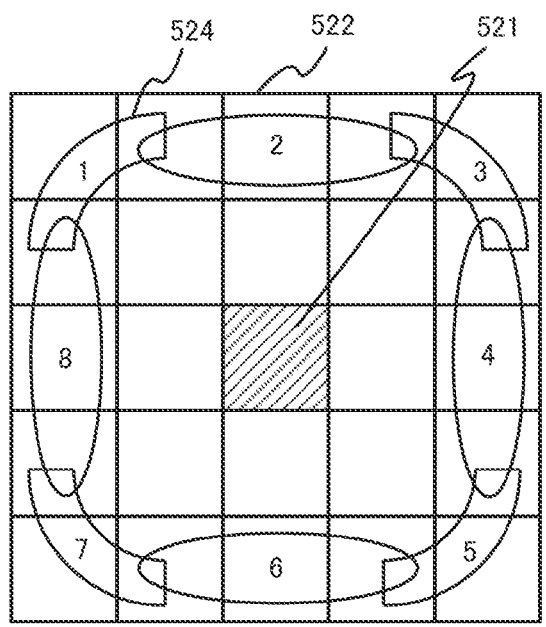
FIG. 11 is a diagram illustrating a second example of the arrangement of the sub-regions in Embodiment 2 of the present invention.
Figure 12:
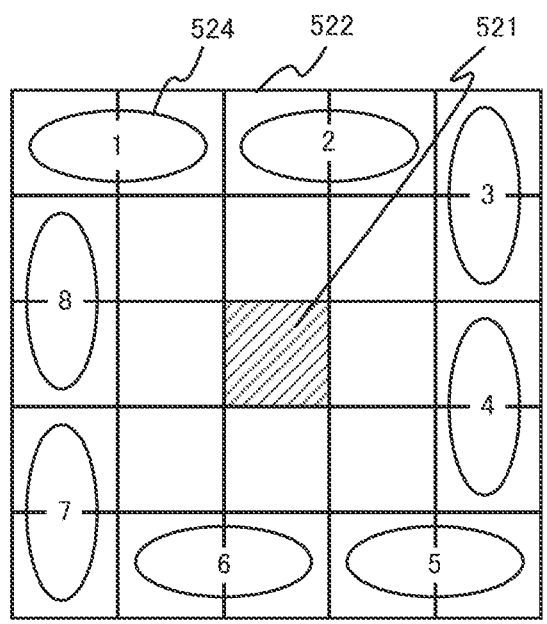
FIG. 12 is a diagram illustrating a third example of the arrangement of the sub-regions in Embodiment 2 of the present invention.

FIGS. 11 and 12 are diagrams illustrating examples of the sub-region arrangement when a pixel group separated from a pixel of interest by one pixel is set to be a sub-region.

As shown in FIGS. 11 and 12, classifier training apparatus 200 and object detection apparatus 400 may set 5 pixels×5 pixels centering around pixel of interest 521 to neighboring region 522.

As shown in FIG. 12, classifier training apparatus 200 and object detection apparatus 400 may separate a group of sixteen pixels separated from pixel of interest 521 by one pixel into eight parts without overlapping any pixel and may set eight sub-regions 524 each formed by two pixels.

Alternatively, as shown in FIG. 11, classifier training apparatus 200 and object detection apparatus 400 may separate the group of sixteen pixels into eight parts while overlapping one pixel for each part and may set eight sub-regions 524 each formed by three pixels.

Meanwhile, when the above-mentioned equal pixel value length is secured, classifier training apparatus 200 and object detection apparatus 400 preferably sets sub-regions 524 without overlapping any pixel as shown in FIG. 12. The reason is because sub-regions without overlap are likely to include different feature information, and a small number of pixels for an arithmetic operation involves lower arithmetic operation costs. In addition, as shown in FIG. 11, when sub-regions 524 overlap with each other, overlapping neighboring sub-regions include the same feature information, and an increase in the number of pixels also involves higher arithmetic operation costs.

Figure 13:
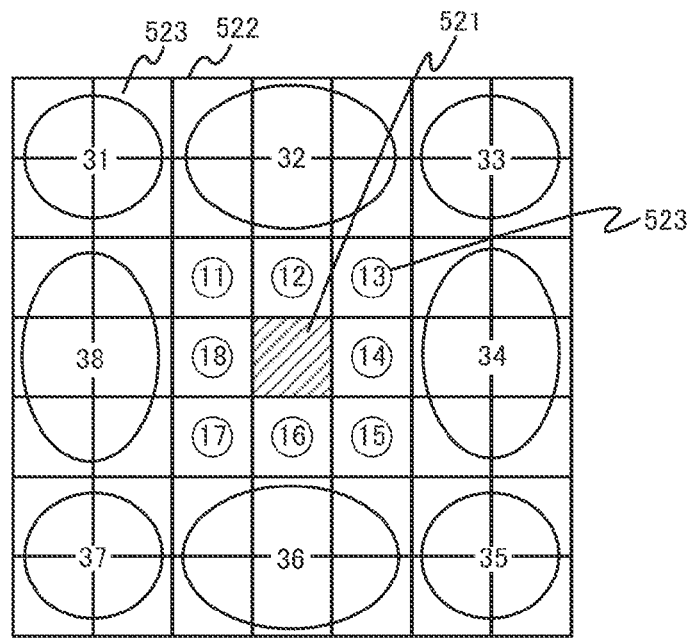
FIG. 13 is a diagram illustrating a fourth example of the arrangement of the sub-regions in Embodiment 2 of the present invention.
Figure 14:
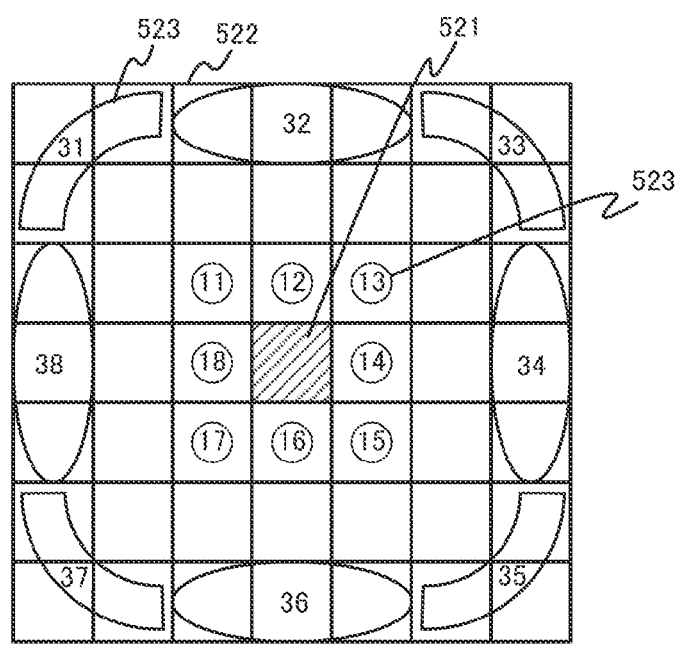
FIG. 14 is a diagram illustrating a fifth example of the arrangement of the sub-regions in Embodiment 2 of the present invention.

FIGS. 13 and 14 are diagrams illustrating examples of the arrangement of sub-regions when an adjacent pixel group and a pixel group separated from the pixel of interest by two pixels are set to be sub-regions.

As shown in FIGS. 13 and 14, classifier training apparatus 200 and object detection apparatus 400 may set 7 pixels×7 pixels centering around pixel of interest 521 to neighboring region 522, and may set eight adjacent pixels to be sub-regions 523.

As shown in FIG. 14, classifier training apparatus 200 and object detection apparatus 400 may further set regions obtained by separating a group of twenty-four pixels separated from the pixel of interest 521 by two pixels into eight parts, to be sub-regions 524.

Alternatively, as shown in FIG. 13, classifier training apparatus 200 and object detection apparatus 400 may acquire forty pixel groups constituted by a group of sixteen pixels separated from pixel of interest 521 by one pixel and a group of twenty-four pixels separated from the pixel of interest by two pixels. Classifier training apparatus 200 and object detection apparatus 400 may set region obtained by separating these pixel groups into eight parts, to be sub-regions 523.

In the case of FIG. 13, the size of sub-region 523 is large, and the number of pixels used in the arithmetic operation of the local binary pattern increases. It is considered that the arithmetic operation costs increase with an increase in the number of pixels although detection accuracy improves in this case.

However, as mentioned above, since the pixel values between adjacent pixels are similar to each other, detection accuracy in the case of FIG. 14 can be made to be equal to detection accuracy in the case of FIG. 13 in consideration of the spatial frequency characteristics of camera 310.

Figure 15:
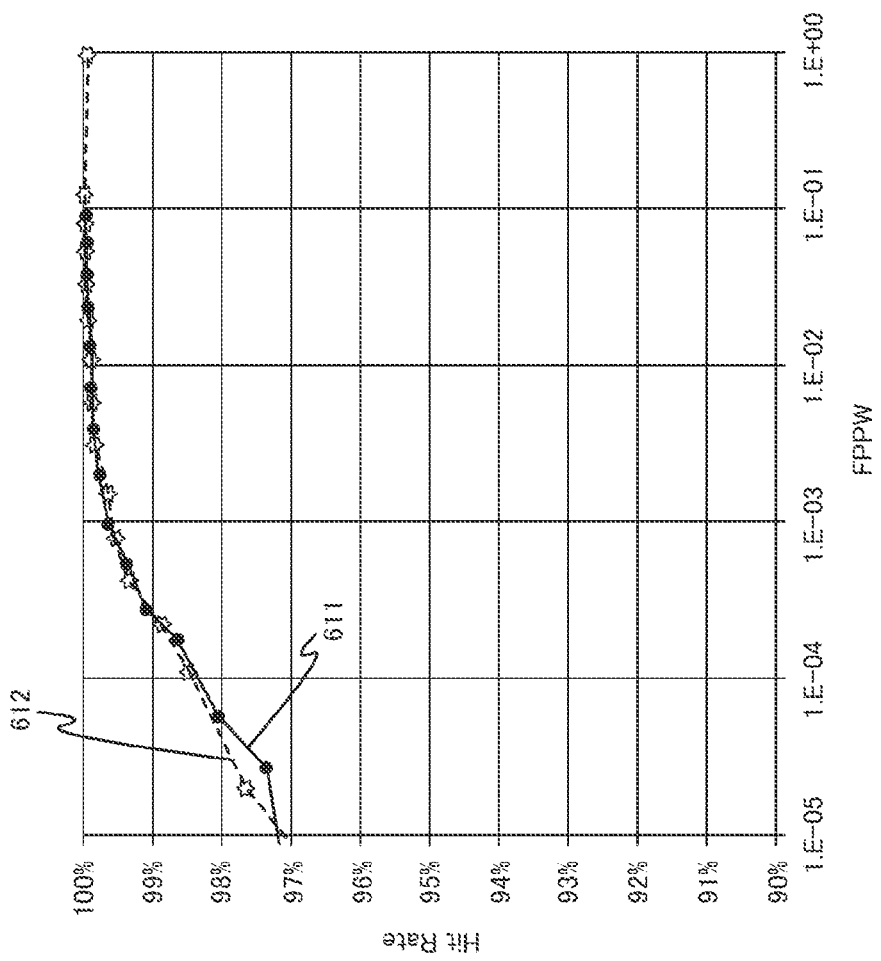
FIG. 15 is a diagram illustrating results of experiments on performance evaluation of the fourth example and the fifth example of the arrangement of the sub-regions in Embodiment 2 of the present invention.

FIG. 15 is a diagram illustrating results of experiments on performance evaluation in object detection of the arrangement of sub-regions shown in FIG. 13 and the arrangement of sub-regions shown in and FIG. 14 when the spatial frequency characteristics of camera 310 are taken into consideration. In FIG. 15, the horizontal axis represents FPPW (False Positive Per Window) which is a false detection rate with respect to non-detected target data sets, and the vertical axis represents Hit Rate which is a detection rate with respect to detected target data sets.

As shown in FIG. 15, performance curve 611 in the case of the arrangement of sub-regions shown in FIG. 14 substantially matches performance curve 612 in the case of the arrangement of sub-regions shown in FIG. 13.

In this manner, when the arrangement of sub-regions is set in consideration of the spatial frequency characteristics of camera 410, it was confirmed that it is possible to obtain high detection accuracy while limiting an increase in the arithmetic operation costs.

In addition, in the above description, an example has been described in which when sub-regions having different distances from the pixel of interest are arranged, the sub-regions are arranged in the same direction when viewed from the pixel of interest. However, the arrangement of sub-regions is not limited to this example.

Figure 16:
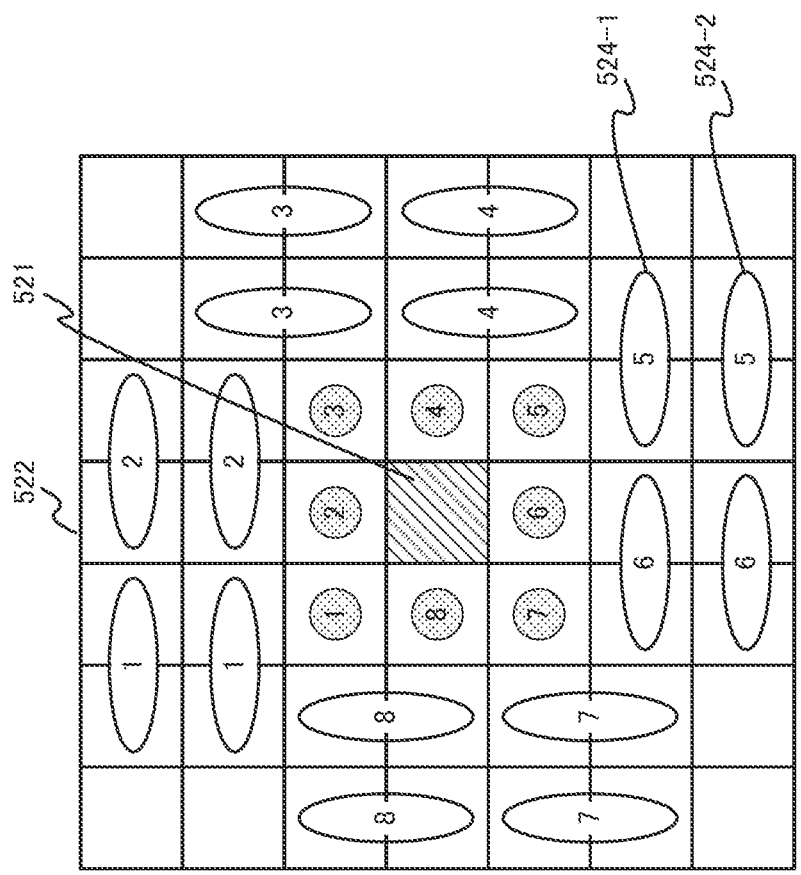
FIG. 16 is a diagram illustrating a sixth example of the arrangement of the sub-regions in Embodiment 2 of the present invention.

FIG. 16 illustrates an example of the arrangement of sub-regions when the center positions of sub-regions adjacent to the pixel of interest in a radial direction are made to match each other. This is an example of the arrangement of sub-regions when the spatial frequency characteristics of camera 410 are not taken into consideration.

In such a case, as shown in FIG. 16, for example, the center of sub-region 524-1 separated from pixel of interest 521 by one pixel and the center of sub-region 524-2 separated from pixel of interest 521 by two pixels have a distance of one pixel in neighboring region 522.

Figure 17:
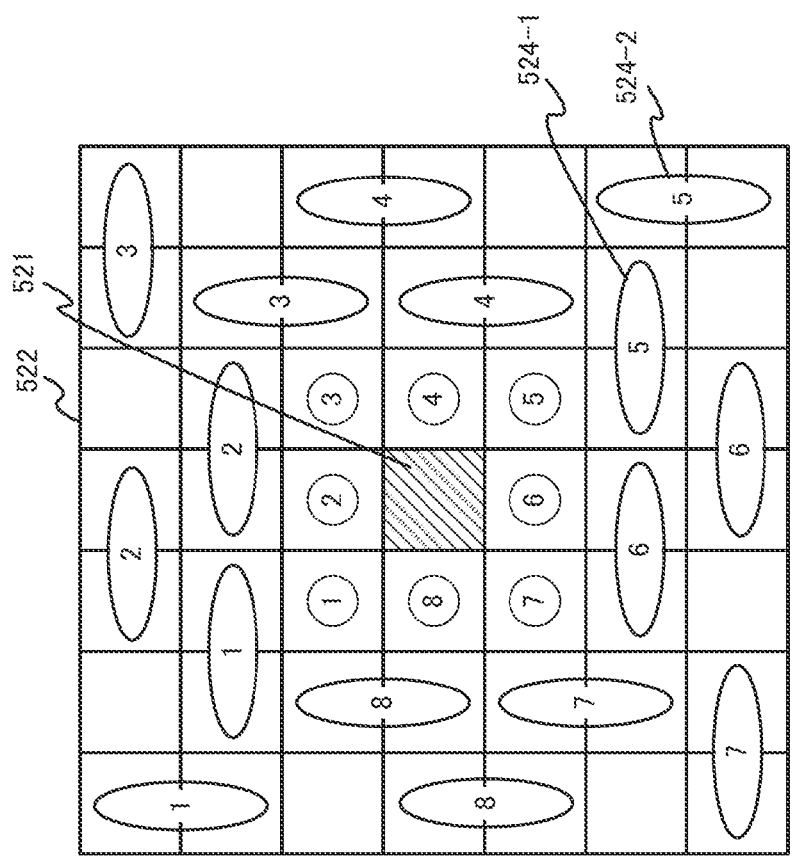
FIG. 17 is a diagram illustrating a seventh example of the arrangement of the sub-regions in Embodiment 2 of the present invention.

FIG. 17 is an example of the arrangement of sub-regions when the center positions of sub-regions adjacent to the pixel of interest in a radial direction are made different from each other. This is an example of the arrangement of sub-regions when the spatial frequency characteristics of camera 410 are taken into consideration.

In such a case, as shown in FIG. 17, for example, the center of sub-region 524-1 separated from pixel of interest 521 by one pixel and the center of sub-region 524-2 separated from pixel of interest 521 by two pixels have a distance exceeding one pixel in neighboring region 522.

In order to limit a loss of the amount of information and also to limit the amount of arithmetic operation and the number of feature dimensions for of feature extraction, using the spatial frequency characteristics of camera 410, the center positions of sub-regions 524 adjacent to each other in a radial direction are preferably separated by a distance exceeding one pixel as shown in FIG. 17.

FIG. 18 is a diagram illustrating results of experiments on performance evaluation in object detection of the arrangement of sub-region shown in FIG. 16 and the arrangement of sub-regions shown in FIG. 17.

As shown in FIG. 18, performance curve 622 in the case of the arrangement of sub-region shown in FIG. 17 is located above performance curve 621 in the case of the arrangement of sub-regions shown in FIG. 16. That is, it was confirmed that performance in the case of the arrangement of sub-regions shown in FIG. 17 is better than performance in the case of the arrangement of sub-regions shown in FIG. 16.

Meanwhile, it was found through an experiment performed separately that the appropriate range to be adopted as the arrangement of sub-regions limits to pixels separated from the pixel of interest by four pixels. This is because, when a distance to a sub-region from the pixel of interest is too long, the sub-region is too far away from a target pixel, and there is a high possibility that the sub-region may include image which is not the part of target object.

As described above, it is preferable that the sub-region be set to have a length of two to three pixels, and the center positions of the sub-regions are at a distance exceeding one pixel in a radial direction without overlapping another sub-region in a circumferential direction and are located within a range separated from the pixel of interest by four pixels. On the other hand, even when the sub-region is arranged to be separated from the pixel of interest by one pixel in a radial direction, there is no influence on detection performance. Therefore, in object detection system 100, the sub-regions are preferably arranged in the manner illustrated in FIG. 8, for example.

The types of sub-region arrangements have been described thus far.

As described above, object detection system 100 according to the present embodiment can generate a local binary pattern from the representative value of pixel values of a plurality of pixels, including pixels separated from the pixel of interest for arithmetic operation of the local binary pattern. Thereby, object detection system 100 can generate a local binary pattern from more pixels while limiting a decrease in the accuracy of object detection and an increase in the processing load.

Meanwhile, when the number of pixels used in generating a local binary pattern increases, there is a high possibility of an incorrect local binary pattern being generated in a case of a noisy image such as an image taken at night. When the extraction accuracy of an image feature decreases, the accuracy of a classifier generated from a histogram or the accuracy of object detection performed using a histogram also decreases.

In this regard, object detection system 100 uses the representative value (average value) of pixel values of a plurality of pixels, thereby reducing the influence of noise on object detection accuracy in units of pixels. That is, in object detection system 100, a histogram capable of object detection robust to even a noisy image taken in such an environment as low illuminance can be extracted as an image feature of an image.

Additionally, in object detection system 100, pixel regions having a small change in pixel values in the neighboring region can be grouped in consideration of the spatial frequency characteristics of camera 410 and be defined as a sub-region. Thereby, object detection system 100 can reduce the processing load of a classifier in object detection while maintaining detection accuracy.

Note that, in the embodiments described above, an example has been described in which classifier training apparatus 200, classifier storage apparatus 300, and object detection apparatus 400 are described as separate components, but two or all of these apparatuses may be integrated as a single unit. Particularly, when classifier training apparatus 200 and object detection apparatus 400 are integrated as a single unit, feature extracting sections 220 and 43 can be configured as a common function section. Additionally, in the present embodiment, Boosting is used as a machine learning method, but any other machine learning methods such as SVM (Support Vector Machine) or a decision tree can be used as well.

The disclosure of Japanese Patent Application No. 2011-176139, filed on Aug. 11, 2011, including the specification, drawings and abstract, is incorporated herein by reference in its entirety.

INDUSTRIAL APPLICABILITY

The feature extraction apparatus, the feature extraction program, and the image processing apparatus according to the present invention are suitable for use as a feature extraction apparatus, a feature extraction method, a feature extraction program, and an image processing apparatus which are capable of generating a local binary pattern from more pixels while limiting a decrease in the accuracy of object detection and an increase in the processing load.

REFERENCE SIGNS LIST

10 Feature extraction apparatus
100 Object detection system
200 Classifier training apparatus
210 Training data storage section
220 Feature extracting section
240 Training section
300 Classifier storage apparatus
400 Object detection apparatus
410 Camera
420 Image receiving section
430 Feature extracting section
431 Feature extraction region acquiring section
432 Region scanning section
433 Sub-region setting section
434 Binary pattern generating section
435 Neighboring region acquiring section
436 Sub-region setting section
437 Region representative value calculating section
438 Sub-region difference calculating section
439 Binary pattern calculating section
440 Histogram generating section
450 Identifying section

The invention claimed is:

1. A feature extraction apparatus comprising:
a sub-region setting section that sets all or some pixels in an image taken by a camera to be pixels of interest, respectively, and that sets a plurality of sub-regions with respect to each of the pixels of interest based on spatial frequency characteristics of the camera; and
a binary pattern generating section that generates a local binary pattern for each of the pixels of interest, the local binary pattern indicating comparison results between a pixel value of the pixel of interest and pixel values of the plurality of set sub-regions using bit values, wherein
the plurality of sub-regions include at least a sub-region constituted by a plurality of pixels including a pixel separated from a corresponding one of the pixels of interest by one or more pixels, and
at least one of a width and a length of the sub-region is equal to or less than the number of pixels equivalent to the reciprocal of the maximum value of a spatial frequency of the camera.

2. The feature extraction apparatus according to claim 1, wherein the binary pattern generating section calculates representative values respectively for the sub-regions, each of the representative values representing a pixel value of one pixel or a group of pixel values of a plurality of pixels constituting a corresponding one of the sub-regions, and generates, as the local binary pattern, bit data indicating whether differences between a pixel value of the pixel of interest and the representative values are each equal to or greater than a predetermined threshold using bit values.

3. The feature extraction apparatus according to claim 1, wherein the sub-region setting section sets each of the sub-regions so that at least one of a width of the sub-region, a length of the sub-region, a distance of the sub-region from the pixel of interest, and a distance of the sub-region from another sub-region is set to such a size that all pixel values of the sub-region in a length direction of the sub-region are regarded as being nearly equal to each other in view of the spatial frequency characteristics of the camera.

4. The feature extraction apparatus according to claim 1, wherein the sub-region setting section sets the plurality of sub-regions with an equal distance from the pixel of interest.

5. The feature extraction apparatus according to claim 1, wherein the sub-region setting section sets the plurality of sub-regions so that the sub-regions do not overlap each other.

6. The feature extraction apparatus according to claim 1, wherein the sub-region setting section sets the plurality of sub-regions so that the sub-regions are separated from each other.

7. The feature extraction apparatus according to claim 1, wherein the sub-region setting section sets the plurality of sub-regions so that the sub-regions are separated by equiangular intervals to the pixel of interest.

8. The feature extraction apparatus according to claim 1, wherein the sub-region setting section sets at least a plurality of pixels adjacent to the pixel of interest, and regions each constituted by a plurality of pixels separated from the pixel of interest by two or more pixels, to be the sub-regions, respectively.

9. An image processing apparatus comprising:
the feature extraction apparatus according to claim 1, further including a histogram generating section that generates a histogram indicating a distribution of the local binary patterns generated from the image; and
an identifying section that determines whether the image includes a predetermined object using a classifier for identifying the predetermined object, based on the histogram generated by the feature extraction apparatus.

10. A feature extraction method comprising:
setting all or some pixels in an image taken by a camera to be pixels of interest, respectively, and setting a plurality of sub-regions with respect to each of the pixels of interest based on spatial frequency characteristics of the camera; and
generating a local binary pattern for each of the pixels of interest, the local binary pattern indicating comparison results between a pixel value of the pixel of interest and pixel values of the plurality of set sub-regions using bit values, wherein
the plurality of sub-regions include at least a sub-region constituted by a plurality of pixels including a pixel separated from a corresponding one of the pixels of interest by one or more pixels, and
at least one of a width and a length of the sub-region is equal to or less than the number of pixels equivalent to the reciprocal of the maximum value of a spatial frequency of the camera.

* * * * *